US012301026B2

(12) United States Patent
Katsuya (10) Patent No.: US 12,301,026 B2
(45) Date of Patent: May 13, 2025

(54) NON-CONTACT POWER TRANSMISSION SYSTEM

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/224,599

(22) Filed: Jul. 21, 2023

(65) Prior Publication Data

US 2024/0055910 A1    Feb. 15, 2024

(30) Foreign Application Priority Data

Aug. 10, 2022   (JP) .................................. 2022-128360

(51) Int. Cl.
   *H02J 50/80*      (2016.01)
   *B60L 53/39*      (2019.01)
   (Continued)

(52) U.S. Cl.
   CPC .............. *H02J 50/80* (2016.02); *B60L 53/39* (2019.02); *B60L 53/65* (2019.02); *B60L 53/66* (2019.02); *H02J 50/12* (2016.02)

(58) Field of Classification Search
   CPC .. H02J 50/80; H02J 50/12; H02J 53/66; H02J 53/39; H02J 53/65
   (Continued)

(56) References Cited

U.S. PATENT DOCUMENTS

2015/0324798 A1    11/2015   Kai et al.
2017/0111347 A1*    4/2017   Kim ...................... B60L 53/126
(Continued)

FOREIGN PATENT DOCUMENTS

JP      2012-075302      4/2012
JP      2012-157167      8/2012
(Continued)

OTHER PUBLICATIONS

Japanese Office Action for Japanese Patent Application No. 2022-128360 mailed Jun. 4, 2024.

*Primary Examiner* — Michael R. Fin
(74) *Attorney, Agent, or Firm* — Amin, Turocy & Watson, LLP (57) ABSTRACT

A non-contact power transmission system includes an in-vehicle communication device, a power receiving device, and a control device. The in-vehicle communication device communicates with a roadside communication device placed around a traveling path of a vehicle. The power receiving device transfers and receives electric power transmitted in a non-contact manner between a power transmitting device and the power receiving device. The control device acquires key information through communication between the roadside communication device and the in-vehicle communication device before the vehicle reaches a power transmission section of the power transmitting device. The control device causes the power transmitting device to start power transmission in response to verification of the key information, by sending information having at least the key information to the power transmitting device, through communication between the power transmitting device and the power receiving device when the vehicle is present in the power transmission section.

10 Claims, 8 Drawing Sheets

(51) Int. Cl.
  *B60L 53/65* (2019.01)
  *B60L 53/66* (2019.01)
  *H02J 50/12* (2016.01)
(58) Field of Classification Search
  USPC .................................. 307/9.1, 10.1, 104
  See application file for complete search history.

(56) References Cited

U.S. PATENT DOCUMENTS

| | | | |
|---|---|---|---|
| 2019/0047431 A1 | 2/2019 | Iwashita et al. | |
| 2023/0088727 A1* | 3/2023 | Seong | H02J 7/0013 320/108 |

FOREIGN PATENT DOCUMENTS

| | | |
|---|---|---|
| JP | 2014-079077 | 5/2014 |
| JP | 2015-228789 | 12/2015 |
| JP | 2017-163824 | 9/2017 |
| JP | 2019-037031 | 3/2019 |

* cited by examiner

NON-CONTACT POWER TRANSMISSION SYSTEM

CROSS-REFERENCE TO RELATED APPLICATION

Priority is claimed on Japanese Patent Application No. 2022-128360, filed Aug. 10, 2022, the content of which is incorporated herein by reference.

BACKGROUND OF THE INVENTION

Field of Invention

This invention relates to a non-contact power transmission system.

Description of Related Art

In recent years, in order to ensure that more people have access to affordable, reliable, sustainable, and advanced energy, research and development has been conducted on charging and supplying power in vehicles that contribute to energy efficiency.

In the related art, as a non-contact power transmission system that supplies power from outside a vehicle to the vehicle through contactless power transmission, a system is known that establishes a charge based on the amount of power actually supplied by the exchange of communication between a power transmitting side and a power receiving side at each timing before and after the start and end of power transmission, respectively (see, for example, Japanese Unexamined Patent Application, First Publication No. 2014-79077).

In the related art, a system is known that controls the availability of power supply based on the presence or absence of authentication between a power transmitting side and a power receiving side in contactless power transmission (see, for example, Japanese Unexamined Patent Application, First Publication No. 2012-75302).

In the related art, a system is known that controls the switching frequency of a power converting unit on a power transmitting side according to the load on a power receiving side in contactless power transmission (see, for example, Japanese Unexamined Patent Application, First Publication No. 2017-163824).

SUMMARY OF THE INVENTION

In contactless power transmission to a moving vehicle, the time required for the vehicle to pass through a power transmitting side coil installed on a traveling path is an extremely short time of about 0.01 seconds. This may cause abnormalities, for example, the vehicle passing through the transmission-side coil before communication between a power transmitting side and a power receiving side is established, power transmission not being established due to unstable communication between the power transmitting side and the power receiving side, or excessive power being supplied.

Aspects of the present invention were invented in consideration of the aforementioned circumstances and an objective thereof is to provide a non-contact power transmission system that can perform appropriate power transmission by independent power control on a power receiving side, and in the long run, to contribute to energy efficiency.

In order to solve the above-mentioned problems and achieve the above-mentioned purposes, the present invention adopts the following aspects.

(1) A non-contact power transmission system according to an aspect of the present invention includes: an in-vehicle communication device that communicates with a communication device located around a traveling path of a vehicle; a power receiving device that transfers and receives electric power transmitted in a non-contact manner between a power transmitting device and the power receiving device; and a control device that controls the in-vehicle communication device and the power receiving device, wherein the control device acquires key information through communication between the communication device and the in-vehicle communication device before the vehicle reaches a power transmission section of the power transmitting device; and causes the power transmitting device to start power transmission in response to verification of the key information, by sending information having at least the key information to the power transmitting device, through communication between the power transmitting device and the power receiving device when the vehicle is present in the power transmission section.

(2) In the above aspect (1), the control device may cause the power transmitting device to start the power transmission at a desired frequency in response to verification of the key information by sending information having at least information of the desired frequency of power transmission to the power transmitting device through communication between the power transmitting device and the power receiving device when the vehicle is present in the power transmission section.

(3) In the above aspect (1), the control device may cause the power transmitting device to shift from a stopped state to a receiving standby state for the information by acquiring the key information through communication between the communication device and the in-vehicle communication device, and to maintain the receiving standby state for a period of time until verification of the key information is completed.

(4) In the above aspect (3), the receiving standby state may be a state in which a power transmission coil of the power transmitting device is short-circuited.

(5) In any one of the above aspects (1) to (4), in the communication between the power transmitting device and the power receiving device, the control device may communicate by a voltage induced in a coil of the power transmitting device by a magnetic field generated in a coil of the power receiving device by a power switching operation of the power receiving device.

(6) In the above aspect (5), in the communication between the power transmitting device and the power receiving device, the control device may send the information by a generation of dominant and recessive digital signals by switching a carrier wave for transmitting the electric power in the non-contact manner from the power receiving device to the power transmitting device or by an amplitude modulation of the carrier wave.

According to the above-mentioned aspect (1), the desired power and transmission efficiency can be ensured by providing the control device that acquires the key information necessary to start power transmission prior to reaching the power transmission section. For example, even if the time to pass through the power transmission section is short due to the high speed of the vehicle carrying the power receiving device 14, the control device 16 can quickly start power transmission in the power transmission section by obtaining permission to execute power transmission prior to reaching the power transmission section.

In the case of the above-mentioned aspect (2), the desired power and transmission efficiency can be ensured by providing the control device that sends information on the desired frequency of power transmission to the power transmitting device. For example, even if the coupling coefficient decreases due to the minimum ground clearance of the vehicle related to the distance between the coil of the power transmitting device and the coil of the power receiving device, and the mounting layout of the power receiving device, etc., the decrease in power and transmission efficiency can be suppressed by the desired frequency that offsets the variation in mutual inductance.

In the case of the above-mentioned aspect (3), the reception and verification of the key information in the power transmission section can be performed quickly by providing the control device that shifts the power transmitting device to the receiving standby state prior to reaching the power transmission section. The power transmitting device is in the stopped state prior to the control device acquiring the key information, thereby reducing the increase in standby power.

In the case of the above-mentioned aspect (4), the communication of information by power transmission from the power receiving device to the power transmitting device can be detected by the voltage and current of the coil of the power transmitting device.

In the case of the above-mentioned aspect (5), by using the coils of the power receiving device and the power transmitting device to communicate with each other, the configuration of the system can be less complicated than, for example, when additional communication devices are provided for each other.

In the case of the above-mentioned aspect (6), it is possible to suppress the complexity of the system configuration and information transmission process, and to easily transmit various types of information by providing the control device that sends information by the carrier wave of power transmission.

DETAILED DESCRIPTION OF THE INVENTION

Hereinafter, a non-contact power transmission system according to an embodiment of the present invention will be described with reference to the accompanying drawings.

Figure 1:
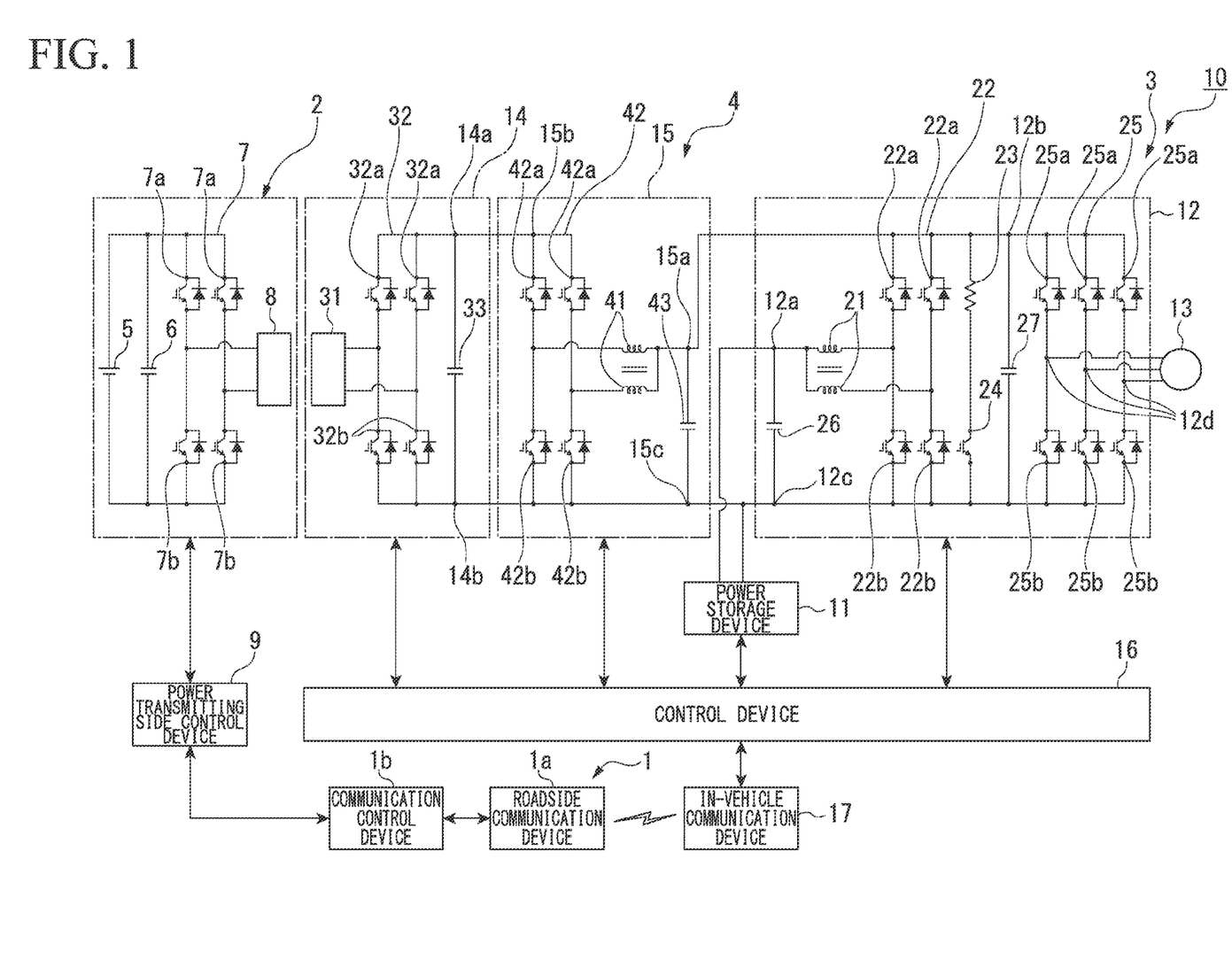
FIG. 1 is a diagram showing a configuration of a non-contact power transmission system in an embodiment of the present invention.
Figure 2:
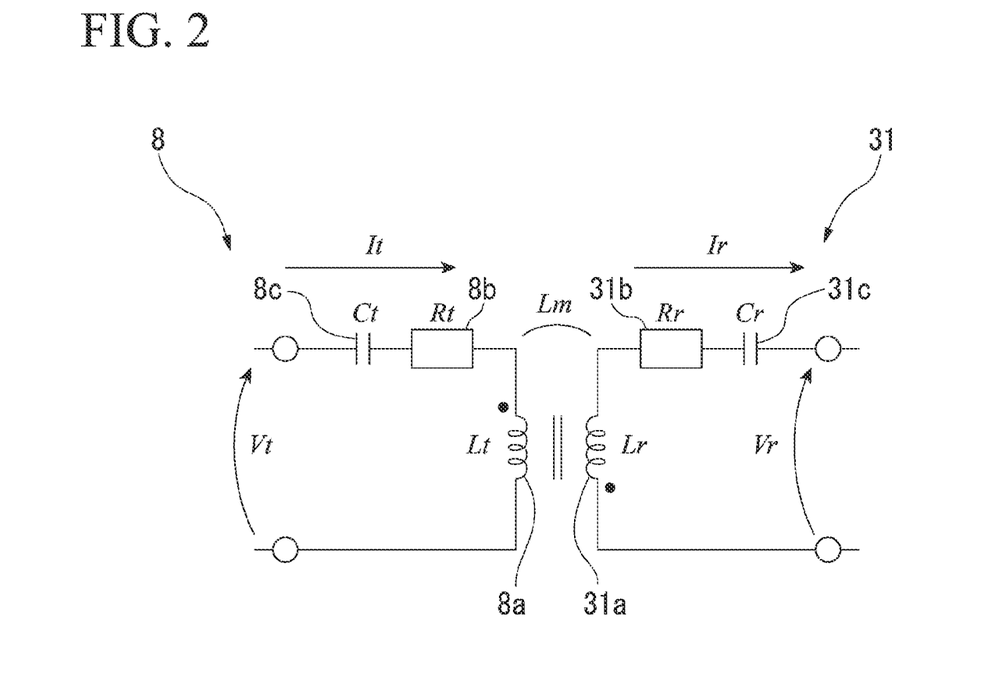
FIG. 2 is a diagram showing a configuration of a power transmitting unit and a power receiving unit of the non-contact power transmission system in the embodiment of the present invention.

FIG. 1 is a diagram showing a configuration of a non-contact power transmission system 10 in an embodiment of the present invention. FIG. 2 is a diagram showing a configuration of a power transmitting unit 8 and a power receiving unit 31 of the non-contact power transmission system 10 in the embodiment of the present invention.

The non-contact power transmission system 10 in the embodiment supplies electric power to a vehicle from outside the vehicle by contactless power transmission.

(Non-Contact Power Transmission System)

As shown in FIG. 1, the non-contact power transmission system 10 of the embodiment includes, for example, a communication system 1 and a power transmitting device 2 installed on a traveling path of a vehicle, etc., and a drive control device 3 and a power control device 4 mounted in the vehicle.

The communication system 1 includes, for example, at least one roadside communication device 1a and a communication control device 1b. The communication system 1 constitutes at least part of an electronic toll collection system, such as the Electronic Toll Collection System (ETC) on toll roads, for example.

The roadside communication device 1a is disposed, for example, upstream of a predetermined power transmission section by the power transmitting device 2 on the traveling path of the vehicle, separated by a predetermined distance. The roadside communication device 1a includes an antenna and the like for wireless communication, and communicates wirelessly with the in-vehicle communication device 17 described below, which is installed in the vehicle. For example, when the roadside communication device 1a obtains from the in-vehicle communication device 17 the information necessary for billing and settlement for power transmission from the power transmitting device 2 to the vehicle, the roadside communication device 1a transmits key information necessary to start power transmission to the in-vehicle communication device 17. The information necessary for billing and settlement is, for example, information unique to the vehicle, such as the presence or absence and identifier of an IC card or in-vehicle transponder for toll collection. The key information is, for example, information that is generated while being updated at a predetermined period to be different for each authorized vehicle passing through a predetermined power transmission section (i.e., a vehicle authorized to perform power transmission). The key information is necessary for the power transmitting device 2 to authenticate a power receiving device 14 described later of the vehicle.

The communication control device 1*b* controls the operation of all the roadside communication devices 1*a* that have been previously associated with it. The communication control device 1*b* is a software functional part that functions by executing a predetermined program by a processor such as a CPU (Central Processing Unit), for example. The software functional part is an ECU equipped with a processor such as a CPU, ROM (Read Only Memory) that stores the program, RAM (Random Access Memory) that temporarily stores data, and electronic circuits such as timers. At least part of the communication control device 1*b* may be an integrated circuit such as an LSI (Large Scale Integration).

For example, the communication control device 1*b* attempts to acquire information necessary for billing and settlement through communication between the roadside communication device 1*a* and the in-vehicle communication device 17 of a surrounding vehicle at a predetermined cycles, etc. When the communication control device 1*b* obtains the information necessary for billing and settlement from the in-vehicle communication device 17 and confirms that electronic settlement is possible, the communication control device 1*b* sends to the in-vehicle communication device 17 the permission information indicating that electronic settlement is possible and the key information necessary to start power transmission. When the key information is sent from the roadside communication device 1*a* to the in-vehicle communication device 17, the communication control device 1*b* sends the same key information to the power transmitting side control device 9 described later.

The power transmitting device 2 includes, for example, a power supply unit 5, a capacitor 6, a power converting unit 7, a power transmitting unit 8, and a power transmitting side control device 9. The power transmitting device 2 may include, for example, at least a plurality of power transmitting units 8 in a predetermined power transmission section in a traveling path of a vehicle.

The power supply unit 5 includes, for example, an AC power supply such as a commercial power supply and an AC-DC converter that converts AC electric power to DC electric power. The power supply unit 5 converts AC electric power supplied from the AC power supply to DC electric power using the AC-DC converter.

The capacitor 6 is connected in parallel to the power supply unit 5. The capacitor 6 smooths DC electric power output from the power supply unit 5.

The power converting unit 7 includes, for example, an inverter that converts DC electric power to AC electric power. The inverter of the power converting unit 7 includes a bridge circuit including a plurality of switching elements that are bridge-connected in two phases and a rectification element. Each of the switching elements is, for example, a transistor such as a metal oxide semiconductor field-effect transistor (MOSFET) of silicon carbide (SiC). The plurality of switching elements include transistors 7*a* and 7*b* in a high-side arm and a low-side arm forming a pair in each phase. A collector of the transistor 7*a* in the high-side arm is connected to a positive electrode of the power supply unit 5. An emitter of the transistor 7*b* in the low-side arm is connected to a negative electrode of the power supply unit 5. An emitter of the transistor 7*a* in the high-side arm and a collector of the transistor 7*b* in the low-side arm are connected to the power transmitting unit 8. Each rectification element is a backflow diode that is forward connected in parallel from the emitter to the collector between the collector and the emitter of each of the transistors 7*a* and 7*b*.

The power transmitting unit 8 transmits electric power through change in a high-frequency magnetic field, for example, by magnetic-field coupling such as magnetic resonance or electromagnetic induction. As illustrated in FIG. 2, the power transmitting unit 8 includes, for example, a resonant circuit which is formed by a primary side coil 8*a*, a primary side resistor 8*b*, and a primary side capacitor 8*c* which are connected in series. The power transmitting unit 8 includes a sensor, such as a current sensor, for detecting a current It flowing in the resonant circuit, for example.

The power transmitting side control device 9 controls the power transmitting device 2 in an integrated manner. The power transmitting side control device 9 is a software functional part that functions by executing a predetermined program by a processor such as a CPU (Central Processing Unit), for example. The software functional part is an ECU equipped with a processor such as a CPU, ROM (Read Only Memory) that stores the program, RAM (Random Access Memory) that temporarily stores data, and electronic circuits such as timers. At least part of the power transmitting side control device 9 may be an integrated circuit such as an LSI (Large Scale Integration).

For example, the power transmitting side control device 9 generates a control signal indicating timings for driving the switching elements of the power transmitting device 2 in the on (connected) state and the off (disconnected) state of each switching element and generates a gate signal for actually driving the switching elements between the on (connected) state and the off (disconnected) state on the basis of the control signal. The power transmitting side control device 9 controls the switching of each switching element of the power transmitting device 2 to transmit power from the power transmitting device 2 to the power receiving device 14 of the vehicle.

For example, when the power transmitting side control device 9 receives key information from the communication control device 1*b*, the power transmitting side control device 9 grasps that the same key information has been transmitted from the roadside communication device 1*a* to the in-vehicle communication device 17, and shifts the power transmitting device 2 from a stopped state to a receiving standby state. The stopped state of the power transmitting device 2 is a state in which the switching operation in the power converting unit 7 is stopped, for example, by maintaining each switching element of the power converting unit 7 in the off (shutdown) state. The receiving standby state of the power transmitting device 2 is a state in which information transmission from the power receiving device 14 of the vehicle is detected. The receiving standby state of the power transmitting device 2 is, for example, a short-circuit state of the power converting unit 7.

Figure 3:
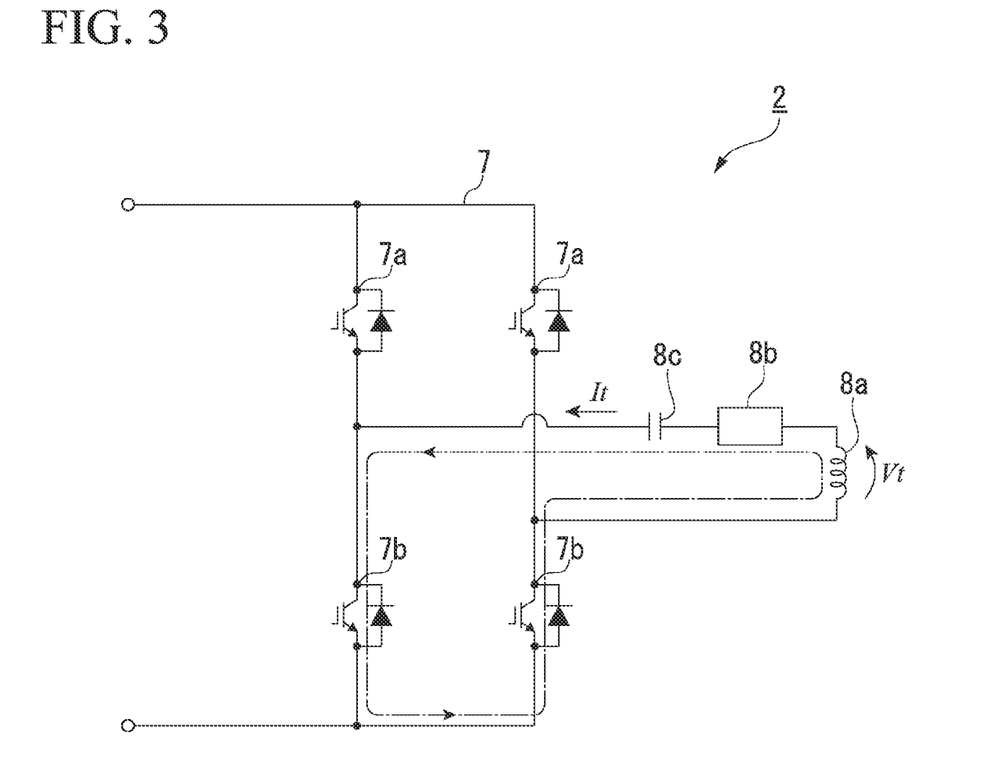
FIG. 3 is a diagram showing a voltage between both ends of a primary-side coil and a current flowing in the primary-side coil in a short-circuit state of the power transmitting device in the embodiment of the present invention.

FIG. 3 is a diagram showing a voltage Vt between both ends of a primary-side coil 8*a* and a current It flowing in the primary-side coil 8*a* in a short-circuit state of the power transmitting device 2 in the embodiment.

As shown in FIG. 3, the power transmitting side control device 9 short-circuits the primary-side coil 8*a* by setting the transistor 7*b* of the low-side arm of each phase to ON in the short-circuit state of the power transmitting device 2. As a result, when looking at the primary-side power transmitting device 2 from the secondary-side power receiving device 14, the impedance of the primary side becomes a very large value, but when a magnetic field is generated by the secondary side coil 31*a* of the power receiving device 14 during PING transmission as described later, a communication from the power receiving device 14 is detected by the voltage induced in the primary-side coil 8a of the power transmitting device 2.

For example, when the power transmitting side control device 9 receives information such as key information and desired frequency of power transmission from the power receiving device 14, the power transmitting side control device 9 checks the key information received from the communication control device 1b against the key information received from the power receiving device 14. When the key information matches, the power transmitting side control device 9 shifts the power transmitting device 2 from the short-circuit state to a power transmission state. The power transmission state of the power transmitting device 2 is, for example, a state in which power is transmitted at the desired frequency of the power receiving device 14.

As illustrated in FIG. 1, the drive control device 3 of the vehicle includes, for example, a power storage device 11, a first power converting device 12, and a rotary electric machine 13.

The power control device 4 of the vehicle includes, for example, a power receiving device 14, a second power converting device 15, a control device 16, and an in-vehicle communication device 17.

The power storage device 11 is charged with electric power that is transmitted from the power transmitting device 2 outside of the vehicle in a non-contact manner. The power storage device 11 receives and transmits electric power from and to the rotary electric machine 13 via the first power converting device 12.

The power storage device 11 includes, for example, a battery, such as a lithium-ion battery, a current sensor for detecting a battery current and a voltage sensor for detecting a battery voltage. The power storage device 11 is connected to a positive terminal 12a on the primary side and a negative terminal 12c of the first power converting device 12 which will be described later.

The first power converting device 12 includes, for example, a voltage controller that converts input and output power when charging and discharging the power storage device 11 by bi-directional voltage conversion for step-up and step-down, and a power converter that converts DC electric power and AC electric power. The first power converting device 12 includes, for example, a pair of reactors 21, a first element module 22, a resistor 23, a switching element 24, a second element module 25, a first capacitor 26, and a second capacitor 27.

For example, the pair of reactors 21, the first element module 22 and the first capacitor 26 constitute the voltage controller, and the second element module 25 and the second capacitor 27 constitute the power converter.

The pair of reactors 21 are magnetically coupled in opposite polarities to form a compound reactor. The pair of reactors 21 are connected to the positive terminal 12a and the first element module 22 on the primary side.

The first element module 22 includes, for example, a bridge circuit including a plurality of switching elements that are bridge-connected in two phases and a rectification element. Each of the switching elements is, for example, a transistor such as a MOSFET of silicon carbide (SiC). The plurality of switching elements include transistors 22a and 22b in a high-side arm and a low-side arm forming a pair in each phase. A collector of the transistor 22a in the high-side arm is connected to the positive terminal 12b on the secondary side. An emitter of the transistor 22b in the low-side arm is connected to the negative terminal 12c which is common to the primary side and the secondary side. The emitter of the transistor 22a in the high-side arm and the collector of the transistor 22b in the low-side arm are connected to the reactor 21. Each rectification element is a backflow diode that is forward connected in parallel from the emitter to the collector between the collector and the emitter of each of the transistors 22a and 22b.

The first element module 22 includes, for example, a voltage sensor to detect a voltage between the positive terminal 12a and the negative terminal 12c on the primary side and a current sensor to detect a current flowing through the pair of reactors 21.

The pair of reactors 21 and the first element module 22 perform voltage conversion through so-called two-phase interleave. In the two-phase interleave, a first period of switching control of the transistors 22a and 22b in a first phase and a first period of switching control of the transistors 22a and 22b in a second phase out of the transistors 22a and 22b in two phases connected to the pair of reactors 21 are deviated from each other by a half period.

The resistor 23 and the switching element 24 are connected in series. The switching element 24 is, for example, a transistor such as a MOSFET of SiC. The resistor 23 is connected to the positive terminal 12b and the collector of the switching element 24 on the secondary side and the emitter of the switching element 24 is connected to the negative terminal 12c.

The second element module 25 includes, for example, a bridge circuit including a plurality of switching elements that are bridge-connected in three phases and a rectification element. Each of the switching elements is, for example, a transistor such as a MOSFET of silicon carbide (SiC). The plurality of switching elements include transistors 25a and 25b in a high-side arm and a low-side arm forming a pair in each phase. A collector of the transistor 25a in the high-side arm is connected to the positive terminal 12b on the secondary side. An emitter of the transistor 25b in the low-side arm is connected to the negative terminal 12c. The emitter of the transistor 25a in the high-side arm and the collector of the transistor 25b in the low-side arm are connected to the stator winding of the rotary electric machine 13 via an AC terminal 12d. Each rectification element is, for example, a backflow diode that is forward connected in parallel from the emitter to the collector between the collector and the emitter of each of the transistors 25a and 25b.

The second element module 25 includes for example, a current sensor that detects a current flowing from each AC terminal 12d to a stator winding of the rotary electric machine 13.

The first capacitor 26 is connected to the positive terminal 12a and the negative terminal 12c on the primary side. The second capacitor 27 is connected to the positive terminal 12b and the negative terminal 12c on the secondary side between the first element module 22 and the second element module 25. The capacitors 26 and 27 smooth voltage change that occurs with an operation of switching the switching elements between an on state (connected) and an off state (disconnected) of each switching element.

The second element module 25 controls an operation of the rotary electric machine 13 through transmission and reception of electric power. The second element module 25 converts DC electric power input from the positive terminal and the negative terminal to three-phase AC electric power and supplies the three-phase AC electric power to the rotary electric machine 13, for example, when the rotary electric machine 13 is powered. The second element module 25 generates a rotational driving force by causing a current to flow sequentially to three-phase stator windings of the rotary electric machine 13.

The second element module 25 converts three-phase AC electric power input from the three-phase stator windings to DC electric power by driving the on state (connected) and the off state (disconnected) of the switching elements in the phases which are synchronized with rotation of the rotary electric machine 13, for example, when the rotary electric machine 13 is regenerated. The second element module 25 can supply DC electric power to which three-phase AC electric power is converted to the power storage device 11 via the pair of reactors 21 and the first element module 22.

The rotary electric machine 13 is, for example, a brushless DC motor of three-phase AC. The rotary electric machine 13 includes a rotor that includes a permanent magnet for a magnetic field and a stator that includes three-phase stator windings for generating a rotary magnetic field for generating the rotor. The three-phase stator windings are connected to AC terminals 12d of three phases of the first power converting device 12.

The rotary electric machine 13 generates a rotational driving force by performing a powering operation using electric power supplied from the first power converting device 12. The rotary electric machine 13 generates a travel driving force by performing a powering operation using electric power supplied from the first power converting device 12, for example, when it can be connected to wheels of the vehicle. The rotary electric machine 13 may generate electric power by performing a regenerative operation using a rotational moving force input from the wheels of the vehicle. The rotary electric machine 13 may generate electric power using power of an internal combustion engine when it can be connected to the internal combustion engine of the vehicle.

The power receiving device 14 includes, for example, a power receiving unit 31, a power converting unit 32, and a capacitor 33.

As illustrated in FIG. 2, the power receiving unit 31 receives electric power based on change of a high-frequency magnetic field transmitted from the power transmitting unit 8 through magnetic-field coupling such as magnetic resonance or electromagnetic induction. The power receiving unit 31 includes, for example, a resonant circuit including a secondary side coil 31a, a secondary side resistor 31b, and a secondary side capacitor 31c which are connected in series.

The power receiving part 31 includes a sensor such as a current sensor that detects a current Ir flowing in the resonant circuit, for example.

As illustrated in FIG. 1, the power converting unit 32 includes a so-called full-bridge (or bridgeless and totem-pole) power factor correction (PFC) circuit that converts AC electric power to DC electric power. The so-called bridge-less PFC circuit is an PFC not including a bridge rectifier using a plurality of diodes which are bridge-connected, and the so-called totem-pole PFC circuit is a PFC circuit including a pair of switching elements of the same conductivity type which are connected in series (totem-pole connected) in series in the same direction.

The power converting unit 32 includes, for example, a bridge circuit including a plurality of switching elements and the rectification elements which are bridge-connected in two phases. Each of the switching elements is, for example, a transistor such as an MOSFET of silicon carbide (SiC). The plurality of switching elements include transistors 32a and 32b in a high-side arm and a low-side arm forming a pair in each phase. A collector of the transistor 32a in the high-side arm is connected to the positive terminal 14a on the secondary side. An emitter of the transistor 32b in the low-side arm is connected to the negative terminal 14b on the secondary side. The emitter of the transistor 32a in the high-side arm and the collector of the transistor 32b in the low-side arm are connected to the power receiving unit 31. Each rectification element is, for example, a backflow diode that is forward connected in parallel from the emitter to the collector between the collector and the emitter of each of the transistors 32a and 32b.

The capacitor 33 is connected to the positive terminal 14a and the negative terminal 14b on the secondary side. The capacitor 33 smooths voltage change that occurs with an operation of switching the switching elements between an on state (connected) and an off state (disconnected) of each switching element.

The second power converting device 15 outputs arbitrary DC electric power by converting DC electric power output from the power receiving device 14. The second power converting device 15 includes, for example, a voltage converter for performing voltage conversion for step-down. The second power converting device 15 includes, for example, a pair of reactors 41, an element module 42, and a capacitor 43.

The pair of reactors 41 are magnetically coupled in opposite polarities to form a compound reactor. The pair of reactors 41 are connected to the positive terminal 15a and the element module 42 on the secondary side.

The element module 42 includes, for example, a bridge circuit including a plurality of switching elements and a rectification element that are bridge-connected in two phases. Each of the switching elements is, for example, a transistor such as an MOSFET of SiC. The plurality of switching elements include transistors 42a and 42b in a high-side arm and a low-side arm forming a pair in each phase. A collector of the transistor 42a in the high-side arm is connected to the positive terminal 15b on the primary side. An emitter of the transistor 42b in the low-side arm is connected to the negative terminal 15c which is common to the primary side and the secondary side. The emitter of the transistor 42a in the high-side arm and the collector of the transistor 42b in the low-side arm are connected to the reactor 41. Each rectification element is a backflow diode that is forward connected in parallel from the emitter to the collector between the collector and the emitter of each of the transistors 42a and 42b.

The pair of reactors 41 and the element module 42 perform voltage conversion through so-called two-phase interleave. In the two-phase interleave, a first period of switching control of the transistors 42a and 42b in a first phase and a first period of switching control of the transistors 42a and 42b in a second phase out of the transistors 42a and 42b in two phases connected to the pair of reactors 41 are deviated from each other by a half period.

The capacitor 43 is connected to the positive terminal 15a and the negative terminal 15c on the secondary side. The capacitor 43 smooths voltage change that occurs with an operation of switching the switching elements between an on state (connected) and an off state (disconnected) of each switching element.

The positive terminal 15b on the primary side of the second power converting device 15 is connected to the positive terminal 14a on the secondary side of the power receiving device 14.

The positive terminal 15a on the secondary side of the second power converting device 15 is connected to the positive terminal 12b on the secondary side of the first power converting device 12.

The negative terminal 15c of the second power converting device 15 is connected to the negative terminal 14b on the secondary side of the power receiving device 14 and the negative terminal 12c of the first power converting device 12.

The control device 16 comprehensively controls, for example, the drive control device 3 of the vehicle and the power control device 4. The control device 16 is, for example, a software functional unit serving by causing a processor such as a central processing unit (CPU) to execute a predetermined program. The software functional unit is an electronic central unit (ECU) including the processor such as the CPU and electronic circuits such as a read only memory (ROM) storing a program, a random access memory (RAM) temporarily storing data, and a timer. At least a part of the control device 16 may be integrated circuit such as a large scale integration (LSI) circuit.

For example, the control device 16 generates a control signal indicating timings for driving the switching elements in the on (connected) state and the off (disconnected) state of each switching element and generates a gate signal for actually driving the switching elements between the on (connected) state and the off (disconnected) state on the basis of the control signal. For example, the control device 16 performs power factor correction of an input voltage and an input current while rectifying AC electric power received from the power transmitting device 2 to DC electric power by controlling switching of the switching elements of the power receiving device 14.

For example, the control device 16 controls an output according to a target output by synchronous rectification operation that drives the plurality of switching elements of the power receiving device 14 synchronously on (connected) state and off (disconnected) state, and by short-circuit operation that short-circuits the secondary side coil 31a.

Figure 4:
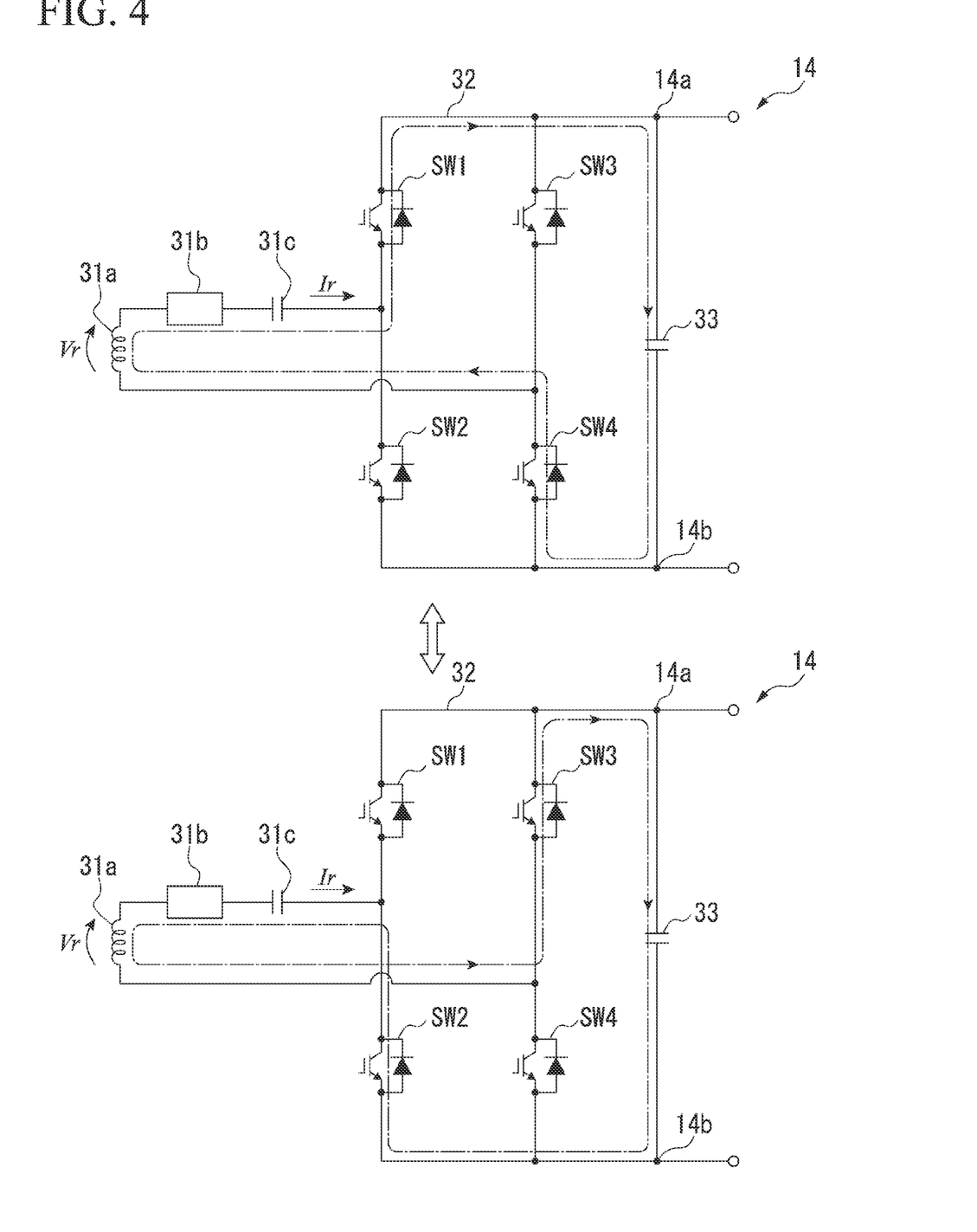
FIG. 4 is a diagram showing a voltage between both ends of a secondary side coil and a current flowing in the secondary side coil in a synchronous rectification operation of a power receiving device in the embodiment of the present invention.
Figure 5:
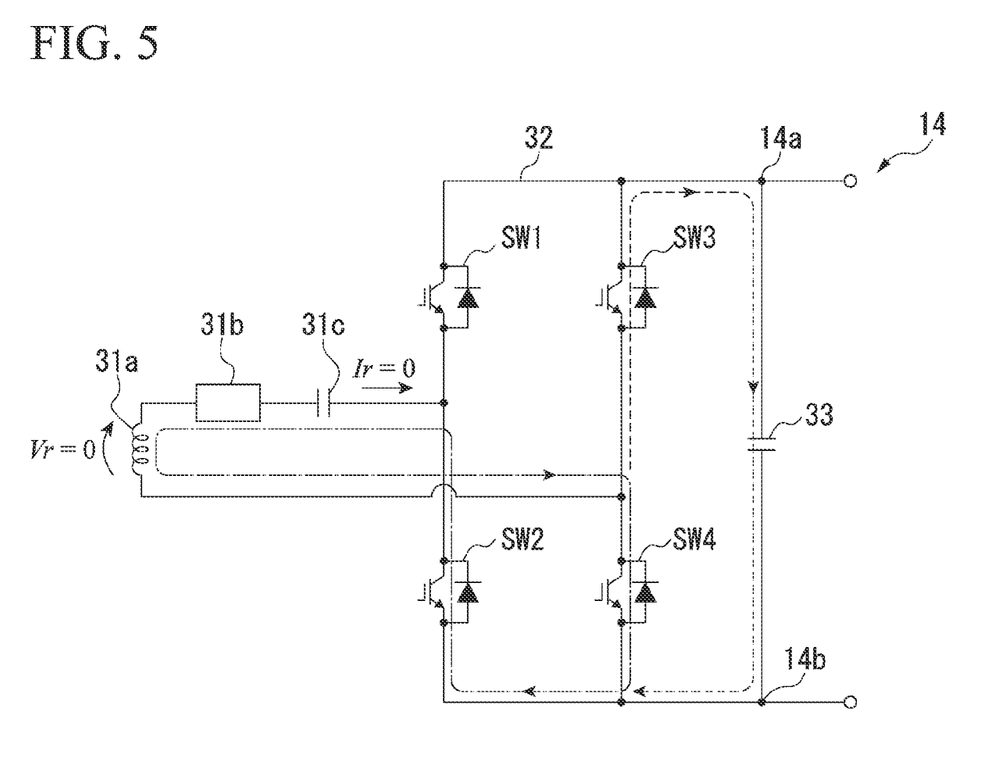
FIG. 5 is a diagram showing a voltage between both ends of the secondary side coil and a current flowing in the secondary side coil in a short-circuit operation of the power receiving device in the embodiment of the present invention.

FIG. 4 is a diagram showing a voltage Vr between both ends of a secondary side coil 31a and a current Ir flowing in the secondary side coil 31a in a synchronous rectification operation of the power receiving device 14 of the embodiment. FIG. 5 is a diagram showing a voltage Vr between both ends of the secondary side coil 31a and a current Ir flowing in the secondary side coil 31a in a short-circuit operation of the power receiving device 14 of the embodiment.

In the following description, the transistors 32a and 32b of the high-side arm and the low-side arm forming a pair in a first phase are referred to as a first switching element SW1 and a second switching element SW2, and the transistors 32a and 32b of the high-side arm and the low-side arm forming a pair in a second phase are referred to as a third switching element SW3 and a fourth switching element SW4.

In the synchronous rectification operation shown in FIG. 4, the control device 16 detects, for example, the current generated in the power receiving unit 31 by the power sent from the power transmitting unit 8, that is, the current Ir flowing in the secondary side coil 31a, and controls the synchronous rectification operation according to the magnitude and phase of the current Ir. The control device 16 controls the switching elements SW1, SW2, SW3, and SW4 in a high-output area including a maximum output of the power receiving device 14 through soft switching such as so-called zero voltage switching (ZVS). The control device 16 performs soft switching by setting a dead-time correction value according to a vehicle height condition based on a distance between the primary side coil 8a and the secondary side coil 31a and electrical characteristics of the vehicle in order to reduce a switching loss due to high-frequency switching. In the zero voltage switching (ZVS), the switching elements SW1, SW2, SW3, and SW4 are turned on (changes from the off state to the on state) after changing the voltage across both terminals to zero by discharging of the output capacity (parasitic capacity) in the off state in the dead-time period of each phase.

In the short-circuit operation shown in FIG. 5, for example, the control device 16 short-circuits the secondary side coil 31a by switching only the low-side arm in each phase to the on state while continuing to perform the synchronous rectification operation in the zero voltage switching (ZVS) in the high-side arm in each phase in the short-circuiting operation. When the second switching element SW2 and the fourth switching element SW4 which are the transistors 32b in the low-side arm in each phase are turned on, a current gathering in the secondary side capacitor 31c connected in series to the secondary side coil 31a flows to the smoothing capacitor 33 via the backflow diode in the high-side arm. Accordingly, since the voltage across both terminals Vr of the secondary side coil 31a decreases to zero and the secondary side coil 31a does not serve as a coil because there is no potential difference, the current Ir based on generation of a magnetic field in the power transmitting unit 8 becomes very small. At this time, when the power receiving device 14 on the secondary side is seen from the power transmitting device 2 on the primary side, the impedance on the secondary side has a very large value, the impedance on the primary side also increases, and thus a current on the primary side (a power-transmitting current: the current It flowing in the primary side coil 8a) is narrowed. That is, the current in the power transmitting device 2 on the primary side is controlled by the power receiving device 14 on the secondary side. The first switching element SW1 and the third switching element SW3 which are the transistor 32a in the high-side arm in each phase in which the synchronous rectification operation is performed according to the current Ir flowing in the secondary side coil 31a stop switching of the synchronous rectification operation because threshold currents are not exceeded, and are separated from the capacitor 31c on the secondary side.

For example, prior to the start of power transmission by the power transmitting device 2 in the power transmission section, the control device 16 transmits information to the power transmitting device 2, such as the key information obtained from the roadside communication device 1a, the desired frequency of power transmission, the target output (power consumption) for fail-safe and information on various abnormalities. The desired frequency of power transmission is set to suppress the efficiency of power transmission and the reduction of output (power) based on, for example, the minimum ground clearance of the vehicle related to the distance between the primary-side coil 8a and the secondary side coil 31a and the mounting layout of the power receiving device 14 in the vehicle.

Figure 6:
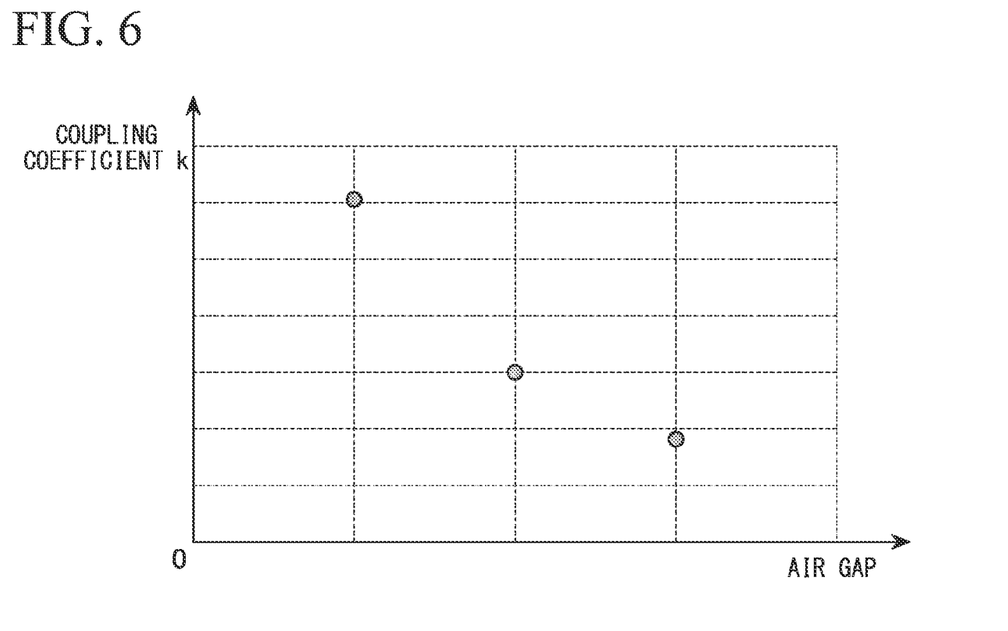
FIG. 6 is a diagram showing an example of a correspondence between an air gap and a coupling coefficient of the secondary side coil of the power receiving device in the embodiment of the present invention.
Figure 7:
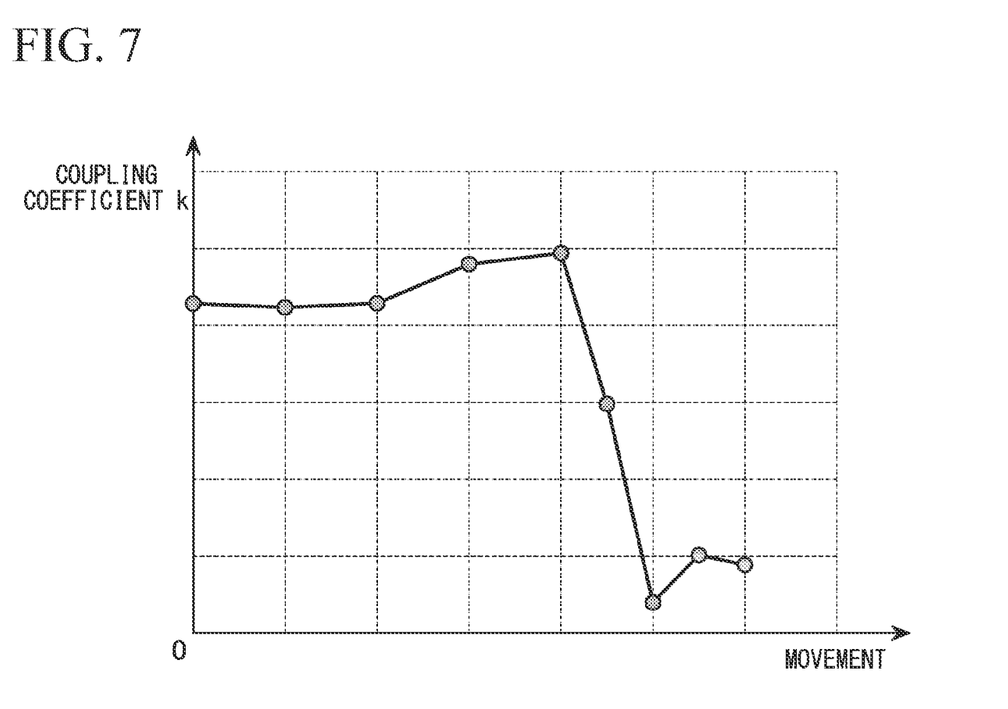
FIG. 7 is a diagram showing an example of a correspondence between a relative movement between the primary-side coil of the power transmitting device and the secondary side coil of the power receiving device and a coupling coefficient in the embodiment of the present invention.

FIG. 6 is a diagram showing an example of a correspondence between an air gap and a coupling coefficient k of the secondary side coil 31a of the power receiving device 14 in the embodiment. FIG. 7 is a diagram showing an example of a correspondence between a relative movement between the primary-side coil 8a of the power transmitting device 2 and the secondary side coil 31a of the power receiving device 14 and a coupling coefficient k in the embodiment.

As shown in FIG. 6, the coupling coefficient k between the primary-side coil 8a and the secondary side coil 31a changes to a decreasing trend as a distance (air gap) between the primary-side coil 8a and the secondary side coil 31a in the vertical direction of the vehicle increases. As shown in FIG. 7, the coupling coefficient k decreases rapidly when the distance (relative movement) between the primary-side coil 8a and the secondary side coil 31a in the direction orthogonal to the vertical direction of the vehicle exceeds a predetermined value.

As shown in Formula (1) below, the coupling coefficient k is described by the self-inductance Lt, Lr and mutual inductance Lm of the primary-side coil 8a and secondary side coil 31a.

$$k = \frac{Lm}{\sqrt{LtLr}} \quad (1)$$

The efficiency η of power transmission between the primary-side coil 8a and the secondary side coil 31a and the output P are described by the respective resistances Rt and Rr of the power transmitting device 8 and power receiving unit 31, the load resistance R, the frequency ω of power transmission, the mutual inductance Lm, the voltage Vt of the primary-side coil 8a and are expressed by the following formulas (2) and (3). Since the mutual inductance Lm varies with the distance between the primary-side coil 8a and the secondary side coil 31a, the desired efficiency η and output P can be secured by varying the frequency ω of power transmission according to the following formulas (2) and (3).

$$\eta = \frac{R}{(Rr+R)\left\{\frac{Rt(Rr+R)}{(\omega Lm)^2}+1\right\}} \quad (2)$$

$$P = \frac{R(\omega Lm)^2}{\{(\omega Lm)^2 + Rt(Rr+R)\}^2} Vt^2 \quad (3)$$

For example, the control device 16 sets the desired frequency of power transmission based on the minimum ground clearance of the vehicle and the mounting layout of the power receiving device 14 on the vehicle, which are known in advance. Further, the control device 16 may set the desired frequency based on the state of power transmission between the power transmitting device 2 and the power receiving device 14.

For example, when the control device 16 receives the key information through communication between the roadside communication device 1A and the in-vehicle communication device 17, the control device 16 transmits the information by power transmission from the power receiving device 14 to the power transmitting device 2 in the receiving standby state as a so-called PING signal transmission. The power receiving device 14 communicates by the voltage induced in the primary-side coil 8a of the power transmitting device 2 by the magnetic field generated in the secondary side coil 31a by the power switching operation by switching in the power converting unit 32. The control device 16 performs the PING transmission, for example, by generating two levels of so-called dominant and recessive digital signals by switching the carrier wave for non-contact power transmission from the power receiving device 14 to the power transmitting device 2 at a predetermined duty ratio.

The predetermined duty ratio is, for example, from a predetermined minimum to 50%. The control device 16 may transmit information, for example, by an amplitude modulation of the carrier wave by changing the switching duty ratio. The control device 16 performs the PING transmission at a predetermined cycle, for example, from several tens of µs to several milliseconds, etc., and when a response signal to the PING transmission is received from the power transmitting device 2, the control device 16 starts power receiving control for the power transmission from the power transmitting device 2.

The following describes processes performed by the power transmitting side control device 9 and the control device 16 as an operation of the non-contact power transmission system 10.

Figure 8:
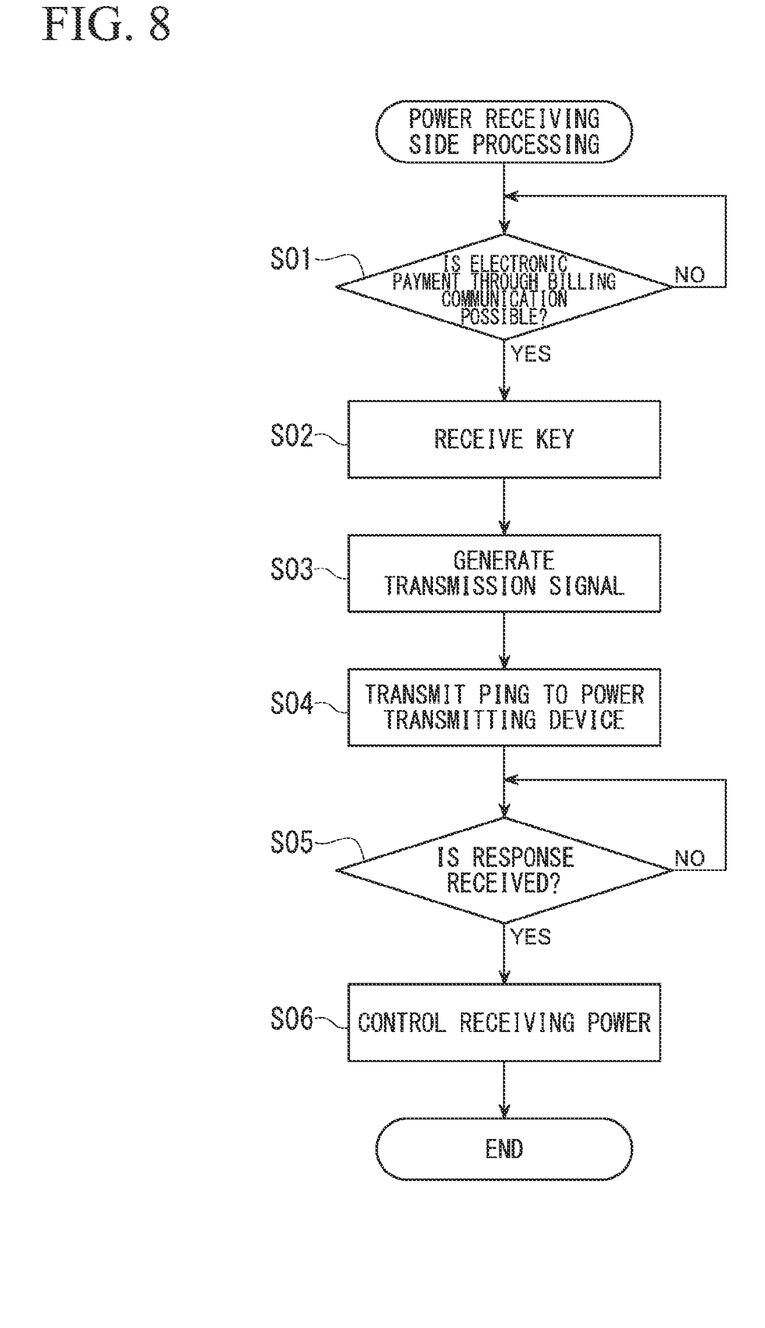
FIG. 8 is a flowchart showing a power receiving side processing of the non-contact power transmission system in the embodiment of the present invention.
Figure 9:
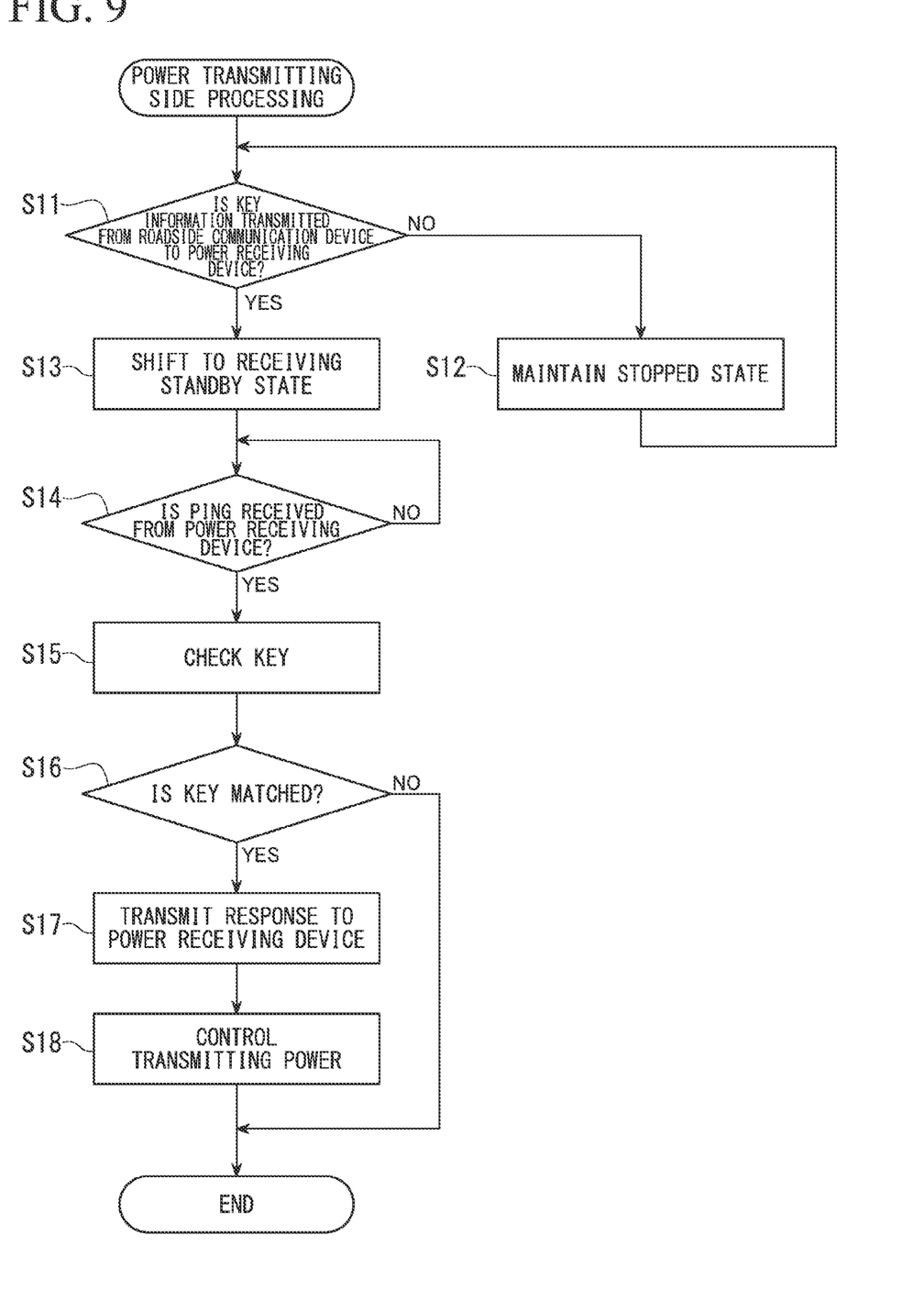
FIG. 9 is a flowchart showing a power transmitting side processing of the non-contact power transmission system in the embodiment of the present invention.

FIG. 8 is a flowchart showing a power receiving side processing executed by the control device 16 of the non-contact power transmission system 10 in the embodiment.
FIG. 9 is a flowchart showing a power transmitting side processing executed by the power transmitting side control device 9 of the non-contact power transmission system in the embodiment.

First, in step S01 shown in FIG. 8, the control device 16 determines whether or not an electronic payment for power transmission from the power transmitting device 2 to the vehicle through wireless communication of information (billing communication) between the roadside communication device 1a and the in-vehicle communication device 17 is possible. If the result of this determination is "NO," the control device 16 repeats the process of step S01. On the other hand, if the result of this determination is "YES," the control device 16 proceeds the process to step S02.

Then, in step S02, the control device 16 obtains the key information necessary to start power transmission from the roadside communication device 1a.

Next, at step S03, the control device 16 generates the signals for the PING transmission by power transmission from the power receiving device 14 to the power transmitting device 2.

Next, at step S04, the control device 16 executes the PING transmission at a predetermined cycle.

Next, at step S05, the control device 16 determines whether or not a response signal to the PING transmission is received from the power transmitting device 2. If the result of this determination is "NO," the control device 16 repeats the process of step S05. On the other hand, if the result of this determination is "YES," the control device 16 proceeds the process to step S06.

Then, in step S06, the control device 16 starts the power receiving control for power transmission from the power transmitting device 2. Then, the control device 16 proceeds the process to the end.

FIG. 9 is a flowchart showing the power transmitting side processing performed by the power transmitting side control device 9 of the non-contact power transmission system 10 in the embodiment.

First, at step S11 shown in FIG. 9, the power transmitting side control device 9 determines whether or not key information is transmitted from the roadside communication device 1a to the power receiving device 14. If the result of this determination is "NO," the power transmitting side control device 9 proceeds to step S12. On the other hand, if the result of this determination is "YES," the power transmitting side control device 9 proceeds to step S13.

Then, in step S12, the power transmitting side control device 9 maintains the stopped state of the power transmitting device 2 and returns the process to step S11.

Then, in step S13, the power transmitting side control device 9 shifts the power transmitting device 2 from the stopped state to the receiving standby state.

Next, at step S14, the power transmitting side control device 9 determines whether or not a PING signal by power transmission from the power receiving device 14 to the power transmitting device 2 is received. If the result of this determination is "NO," the power transmitting side control device 9 repeats the process of step S14. On the other hand, if the result of this determination is "YES," the power transmitting side control device 9 proceeds to step S15.

Next, in step S15, the power transmitting side control device 9 checks the key information received from the communication control device 1b against the key information received from the power receiving device 14.

Next, in step S16, the power transmitting side control device 9 determines whether or not the key information received from the communication control device 1b and the key information received from the power receiving device 14 are matched. If the result of this determination is "NO," the power transmitting side control device 9 proceeds to the end of the process. On the other hand, if the result of this determination is "YES," the power transmitting side control device 9 proceeds to step S17.

Next, in step S17, the power transmitting side control device 9 transmits a response signal to the PING transmission to the power receiving device 14 by power transmission from the power transmitting device 2 to the power receiving device 14.

Next, at step S18, the power transmitting side control device 9 starts power transmission control for the power transmission to the power receiving device 14 at the desired frequency received from the power receiving device 14. The control device 16 then proceeds to the end of the process.

As described above, according to the non-contact power transmission system 10 of the embodiment, the desired power and transmission efficiency can be ensured by providing the control device that acquires the key information necessary to start power transmission prior to reaching the power transmission section. For example, even if the time to pass through the power transmission section is short due to the high speed of the vehicle carrying the power receiving device 14, the control device 16 can quickly start power transmission in the power transmission section by obtaining permission to execute power transmission prior to reaching the power transmission section.

The desired power and transmission efficiency can be ensured by providing a control device 16 that sends information on the desired frequency of power transmission to the power transmitting device 2. For example, even if the coupling coefficient k decreases due to the minimum ground clearance of the vehicle related to the distance between the primary-side coil 8a of the power transmitting device 2 and the secondary side coil 31a of the power receiving device 14 and the mounting layout of the power receiving device 14, etc., the decrease in power and transmission efficiency can be suppressed by the desired frequency that offsets the variation in the mutual inductance Lm.

The reception and verification of the key information in the power transmission section can be performed quickly by providing the control device 16 and the power transmitting side control device 9 that shift the power transmitting device 2 to the receiving standby state prior to arrival at the power transmission section. The power transmitting device 2 is in the stopped state prior to the control device 16 acquiring the key information, thereby reducing the increase in standby power.

The receiving standby state of the power transmitting device 2 is a state in which the transistor 7b in the low-side arm of the power converting unit 7 is turned on and the primary-side coil 8a is short-circuited, thereby the communication of information from the power receiving device 14 to the power transmitting device 2 via the magnetic field can be easily detected by the voltage induced in the primary-side coil 8a.

The configuration of the non-contact power transmission system 10 and the process of information transmission between the power transmitting device 2 and the power receiving device 14 can be suppressed from becoming complicated, and various types of information can be easily transmitted by providing the control device 16 that sends information by the carrier wave of power transmission.

MODIFIED EXAMPLES

Modified examples of the embodiment will be described below. The same symbols will be used for the same parts as in the embodiments described above, and the explanation will be omitted or simplified.

In the embodiment described above, the communication system 1 constitutes the electronic toll collection system, but the present invention is not limited thereto. For example, the communication system 1 may simply be a system that communicates with the in-vehicle communication device 17 prior to power transmission by the power transmitting device 2 in the predetermined power transmission section.

In the embodiment described above, the transmission and reception of information such as the key information and the desired frequency is performed by power transmission between the power transmitting device 2 and the power receiving device 14, but the present invention is not limited thereto. For example, each of the power transmitting device 2 and the power receiving device 14 may be provided with a communication device that performs mutual wireless communication, and may transmit and receive information such as the key information and the desired frequency via mutual communication devices.

In the embodiment described above, the first power converting device 12 is provided with the voltage controller that converts the input/output power of the power storage device 11, but the present invention is not limited thereto and the voltage controller may be omitted. For example, in the case of a hybrid vehicle or the like that is driven by a battery and an internal combustion engine as sources of power, the first power converting device 12 may be provided with a voltage controller, and in the case of an electric automobile or the like that is driven by a battery as a source of power, the first power converting device 12 may not be provided with a voltage controller.

While an embodiment has been described above, these embodiments are provided as examples and are not intended to limit the scope of the present invention. These embodiments can be realized in various other forms, and various omissions, substitutions, and modifications can be added thereto without departing from the gist of the present invention. These embodiments and modifications thereof are included in the scope or gist of the present invention and are also included in the inventions described in the appended claims and equivalent scopes thereof.

What is claimed is:

1. A non-contact power transmission system comprising:
   an in-vehicle communication device that communicates with a communication device located around a traveling path of a vehicle;

a power receiving device that transfers and receives electric power transmitted in a non-contact manner between a power transmitting device and the power receiving device; and a control device that controls the in-vehicle communication device and the power receiving device, wherein the control device acquires key information through communication between the communication device and the in-vehicle communication device before the vehicle reaches a power transmission section of the power transmitting device; and causes the power transmitting device to start power transmission in response to verification of the key information, by sending information having at least the key information to the power transmitting device, through communication between the power transmitting device and the power receiving device when the vehicle is present in the power transmission section, and wherein the control device causes the power transmitting device to start the power transmission at a desired frequency in response to verification of the key information by sending information having at least information of the desired frequency of power transmission to the power transmitting device through communication between the power transmitting device and the power receiving device when the vehicle is present in the power transmission section.

2. The non-contact power transmission system according to claim 1, wherein the control device causes the power transmitting device to shift from a stopped state to a receiving standby state for the information by acquiring the key information through communication between the communication device and the in-vehicle communication device, and to maintain the receiving standby state for a period of time until verification of the key information is completed.

3. The non-contact power transmission system according to claim 2, wherein the receiving standby state is a state in which a power transmission coil of the power transmitting device is short-circuited.

4. The non-contact power transmission system according to claim 1, wherein in the communication between the power transmitting device and the power receiving device, the control device communicates by a voltage induced in a coil of the power transmitting device by a magnetic field generated in a coil of the power receiving device by a power switching operation of the power receiving device.

5. The non-contact power transmission system according to claim 4, wherein in the communication between the power transmitting device and the power receiving device, the control device sends the information by a generation of dominant and recessive digital signals by switching a carrier wave for transmitting the electric power in the non-contact manner from the power receiving device to the power transmitting device or by an amplitude modulation of the carrier wave.

6. A non-contact power transmission system comprising:

an in-vehicle communication device that communicates with a communication device located around a traveling path of a vehicle;

a power receiving device that transfers and receives electric power transmitted in a non-contact manner between a power transmitting device and the power receiving device; and a control device that controls the in-vehicle communication device and the power receiving device, wherein the control device acquires key information through communication between the communication device and the in-vehicle communication device before the vehicle reaches a power transmission section of the power transmitting device; and causes the power transmitting device to start power transmission in response to verification of the key information, by sending information having at least the key information to the power transmitting device, through communication between the power transmitting device and the power receiving device when the vehicle is present in the power transmission section, and wherein in the communication between the power transmitting device and the power receiving device, the control device communicates by a voltage induced in a coil of the power transmitting device by a magnetic field generated in a coil of the power receiving device by a power switching operation of the power receiving device.

7. The non-contact power transmission system according to claim 6, wherein the control device causes the power transmitting device to shift from a stopped state to a receiving standby state for the information by acquiring the key information through communication between the communication device and the in-vehicle communication device, and to maintain the receiving standby state for a period of time until verification of the key information is completed.

8. The non-contact power transmission system according to claim 7, wherein the receiving standby state is a state in which a power transmission coil of the power transmitting device is short-circuited.

9. The non-contact power transmission system according to claim 6, wherein in the communication between the power transmitting device and the power receiving device, the control device sends the information by a generation of dominant and recessive digital signals by switching a carrier wave for transmitting the electric power in the non-contact manner from the power receiving device to the power transmitting device or by an amplitude modulation of the carrier wave.

10. A non-contact power transmission system comprising:

an in-vehicle communication device that communicates with a communication device located around a traveling path of a vehicle;

a power receiving device that transfers and receives electric power transmitted in a non-contact manner between a power transmitting device and the power receiving device; and a control device that controls the in-vehicle communication device and the power receiving device, wherein the control device acquires key information through communication between the communication device and the in-vehicle communication device before the vehicle reaches a power transmission section of the power transmitting device; and causes the power transmitting device to start power transmission in response to verification of the key information while a relative position between the power transmitting device and the power receiving device is changing, by sending information having at least the key information to the power transmitting device, through communication between the power transmitting device and the power receiving device when the vehicle is present in the power transmission section.

\* \* \* \* \*